Dec. 10, 1957  C. E. WRIGHT  2,815,736
SAFETY LOCK FOR FLUID-PRESSURE ACTUATOR
Filed Sept. 19, 1955

INVENTOR.
CLARENCE E. WRIGHT
BY
ATTORNEY.

United States Patent Office 2,815,736
Patented Dec. 10, 1957

2,815,736

SAFETY LOCK FOR FLUID-PRESSURE ACTUATOR

Clarence E. Wright, Kirkwood, Mo.

Application September 19, 1955, Serial No. 534,938

4 Claims. (Cl. 121—40)

This invention pertains to safety devices as applied to hydraulic actuators such as are used for operating the landing gear of aircraft or for positively moving other machine elements.

An object of this invention is to provide a safety lock which will operate automatically upon failure of the actuating fluid pressure to lock the actuator in whatever position it may be, against movement in either direction.

Another object is to provide such a device which will always be locked until the control pressure is supplied thereto.

Generally stated, the device of this invention comprises an actuator cylinder in which a piston and piston rod are movable to perform the functions of the device. Means are provided for supplying fluid pressure, through suitable external control devices, to the cylinder to move the piston. The piston rod is hollow and the bore thereof is formed with closely spaced peripheral grooves for the greater portion of its length. An axially-positioned locking rod is connected at one end to the cylinder head and extends into the bore of the piston rod. This locking rod has a head carrying a plurality of radially-movable locking jaws having ridges matching the grooves of the piston-rod bore. A spring tends to keep these jaws in engagement with said grooves to lock the device. A control piston, working in the locking-rod head, is moved by the same fluid pressure as the main actuator piston to counteract this spring, whereupon retracting springs disengage the jaws. Thus, when the fluid pressure fails, or when the external control devices so require, the piston rod is automatically locked in whatever position it may be in.

Figure 1:
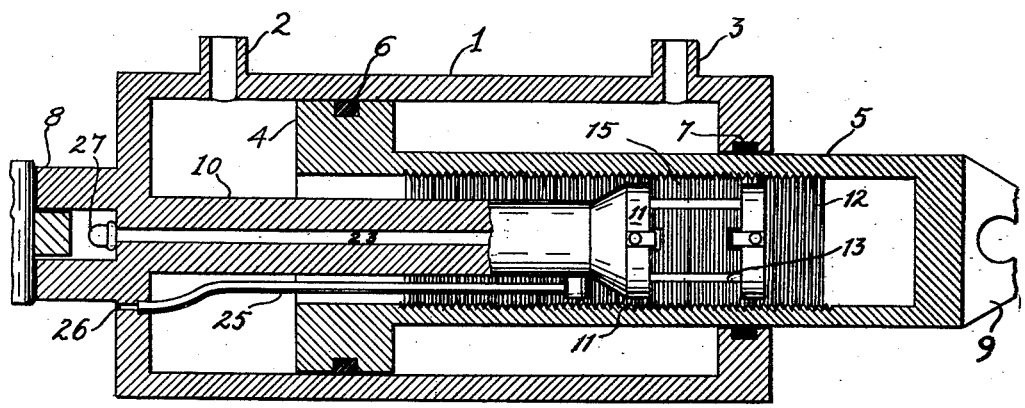
Figure 2:
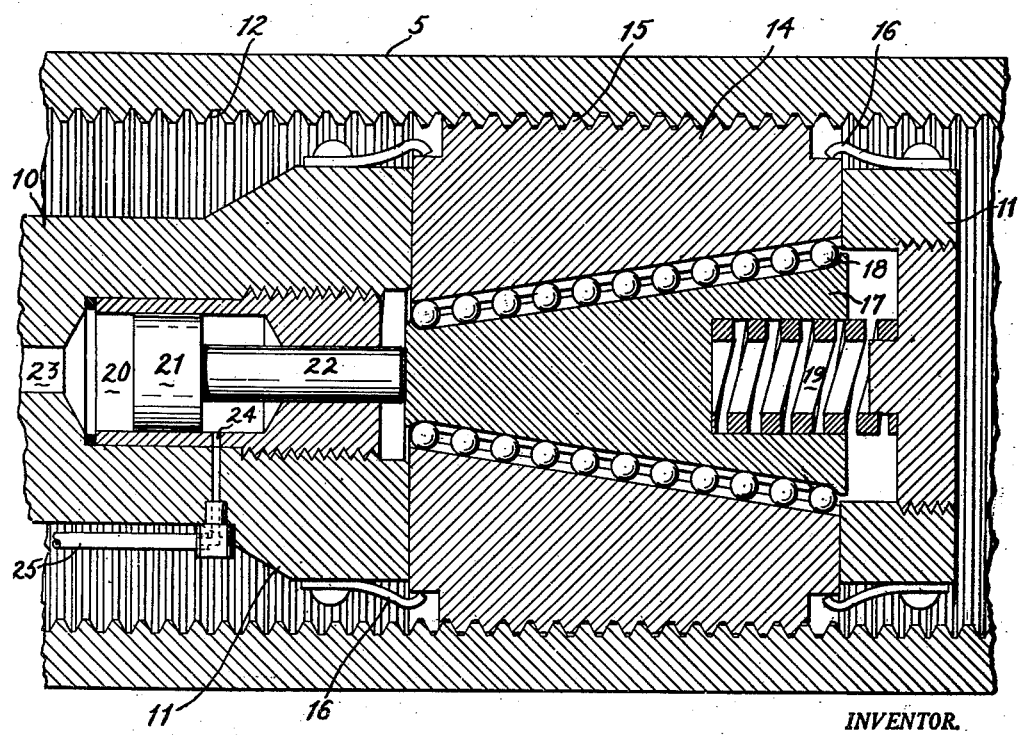

A preferred embodiment of this invention is described in the following specification, taken with the accompanying drawing, in which:

Fig. 1 is a central longitudinal section of an actuator cylinder provided with a safety device in accordance with this invention, and Fig. 2 is an enlarged sectional detail of the locking head.

Referring to the accompanying drawing, 1 designates the actuating cylinder having fluid-pressure connections 2 and 3. A piston 4 is movable in said cylinder by the actuating fluid pressure and has a hollow piston rod 5. The piston and rod are sealed against escape of fluid by seals 6 and 7 respectively. The piston and rod have suitable end connections 8 and 9 respectively, for connection to the device to be actuated.

A locking rod 10 extends axially of the cylinder 1 and is attached to, or formed integral with, the cylinder head as shown in Fig. 1. The rod 10 is formed at its end with a locking head 11. The bore of the piston rod 5 is formed with a series of grooves 12 more or less closely spaced according to the requirements of the particular application. These grooves may be formed each in one plane, or as a thread, the latter being usually more convenient from a manufacturing standpoint. They cover a length of bore sufficient to accommodate the usual travel of the piston rod.

The head 11 is formed with a plurality of radially-extending sockets, separated by partitions 13, in which sockets locking jaws 14 are movable radially. These jaws have peripheral ridges 15 matching the grooves 12. Mounted on the head 11, preferably at both ends of each jaw 14, are retracting springs 16 tending to move the jaws inward toward the cylinder axis. A wedge member 17 is positioned between the jaws 14. This wedge member and the jaws are formed with mutually adjacent, angular wedge faces having ball races adapted to receive balls 18, as shown in Fig. 2, to reduce friction during their relative movement. A spring 19 urges the member 17 in the direction to expand the jaws 14.

A control cylinder 20 is mounted in the head 11 in a position coaxial with the locking rod 10. A piston 21, movable in this cylinder, has a piston rod 22 engaging the end of the wedge member 17 as shown in Fig. 2. Extending axially along the rod 10 is a duct 23 whereby fluid pressure may be conducted to the cylinder 20 behind (left side Fig. 2) the piston 21 to force the rod 22 against the wedge member 17. A duct 24 leads from the cylinder 20 on the other side (right Fig. 2) of the piston 21 and connects with a vent tube 25 leading through a duct 26 in the head of the cylinder 1 to the outer atmosphere. This vent duct prevents any build-up of pressure in the cylinder 20 on the right side of the piston 21.

In the use of this device, connections are made at 8 and 9 to the parts to be actuated, fluid pressure connections to a source of supply are made at 2 and 3 through suitable control means and the same source of fluid pressure is connected to the duct 23, as by a fitting 27. This pressure, acting on the piston 21, moves it and the rod 22 against the wedge member 17, compressing the spring 19 and moving the wedge member to the right, Fig. 2. This relieves the jaws 14 of the wedging action of the member 17 and permits the springs 16 to retract the jaws until the ridges 15 are disengaged from the grooves 12 and renders the main piston rod 5 free to move.

The rod 5 is thus maintained free for movement so long as adequate fluid pressure is maintained in the duct 23. Should this pressure fail at any time, the spring 19 will move the wedge member 17 to force the jaws 14 outward and bring the ridges 15 into engagement with the grooves 12. This locks the piston rod 5 in whatever position in the cylinder 1 it may happen to be in at the moment of pressure failure. And it is locked against movement in either direction.

The control pressure which operates the control piston 21 can be taken from the same source as the actuating pressure which operates the main piston 4. Suitable external control devices may be connected between the source and the actuator to operate it manually or automatically. Thus any failure or inadequacy of the actuating pressure can be used to cause the control cylinder to lock the device.

It will be seen that the device of this invention acts instantly upon reduction, accidental or intentional, of the actuating fluid pressure to lock the moving parts in the condition in which they are at the time of such reduction and holds them in that condition until the pressure is restored.

Changes may be made in the details of construction, within the scope of the appended claims, without departing from the spirit of this invention. Parts of the invention may be used without the whole and improvements may be added while retaining some or all of the advantages of the invention.

Having thus described the invention, what is claimed is:

1. In a fluid-pressure actuator of the character described having a cylinder, a piston movable therein, and means for supplying fluid pressure to the cylinder to move the piston; the improvement comprising, a piston-rod for said piston having a bore extending axially thereof, said bore being formed with closely adjacent circumferential grooves over an extended portion of its length, an axially-extending locking rod within said cylinder and attached to one end thereof and extending into said bore, a plurality of locking jaws mounted on said rod for radial movement relative thereto and formed with peripheral ridges matching said grooves, yielding means retracting said locking jaws from engagement with said grooves, wedge means yieldingly actuated to move said jaws against the force of said retracting means to engage said ridges in said grooves to lock the piston against movement in either direction at any point in the cylinder, and a thrust member connected at all times to the same source so as to be actuated by the fluid pressure supplied to said cylinder to overcome said wedge actuating means and unlock the piston whereby failure of said pressure will release said thrust member to lock the piston.

2. In a fluid-pressure actuator of the character described having a cylinder, a piston movable therein, and means for supplying fluid pressure to the cylinder to move the piston; the improvement comprising, a piston rod for said piston having a bore extending axially thereof, said bore being formed with closely adjacent circumferential grooves over an extended portion of its length, an axially-extending locking rod within said cylinder and attached to one end thereof and extending into said bore, a plurality of locking jaws mounted on said rod for radial movement relative thereto and formed with peripheral ridges matching said grooves, yielding means normally operating to expand said jaws to engage said ridges in said grooves to lock the piston at any position in the cylinder against movement in either direction, and means connected at all times to the same source so as to be actuated by the fluid pressure supplied to the cylinder to overcome said normally-operating expanding means and unlock the piston whereby failure of said pressure will release said last means to lock the piston.

3. In a fluid-pressure actuator of the character described having a cylinder, a piston movable therein, and means for supplying fluid pressure to the cylinder to move the piston; the improvement comprising, a piston rod for said piston having a bore extending axially thereof, said bore being formed with closely adjacent circumferential grooves over an extended portion of its length, an axially-extending locking rod within said cylinder and attached to one end thereof and extending into said bore, a plurality of locking jaws mounted on said rod for radial movement relative thereto and formed with peripheral ridges matching said grooves, yielding means normally operating to expand said jaws to engage said ridges in said grooves to lock the piston at any position in the cylinder against movement in either direction, means providing a cylinder bore in the end of said locking rod, a piston movable in said last bore having a part engageable with said expanding means, a duct formed in said locking rod to supply fluid pressure to said last bore to move the piston therein against said expanding means to unlock said first piston, means for relieving back pressure on said last piston and connections to said duct supplying thereto at all times pressure from the same source as supplies said cylinder, whereby failure of said source will release said expanding means to lock said first piston.

4. In a fluid-pressure actuator of the character described having a cylinder, a piston movable therein, and means for supplying fluid pressure to the cylinder to move the piston; the improvement comprising, a piston-rod for said piston having a bore extending axially thereof, said bore being formed with closely adjacent circumferential grooves over an extended portion of its length, an axially-extending locking rod within said cylinder and attached to one end thereof and having a head extending into said bore, a plurality of locking jaws mounted on said rod for radial movement relative thereto and formed with peripheral ridges matching said grooves, yielding means retracting said locking jaws from engagement with said grooves, each of said locking jaws having an angular inner wedge-face, a wedge member having angular wedge-faces matching those of said jaws and positioned between said jaws in said head, matching ball-races and balls between the matching faces of said wedge member and said jaws, a spring normally urging said wedge member in the direction to expand said jaws, a control cylinder in said head, a piston in said cylinder having a piston rod engaging the end of said wedge member, and means for supplying the same fluid pressure to said control cylinder as is supplied to the actuator cylinder.

References Cited in the file of this patent

UNITED STATES PATENTS 1,740,683    Gartin  ---------------- Dec. 24, 1929

FOREIGN PATENTS 343,240    Germany  -------------- Oct. 29, 1921
592,859    Marquis et al.  ---------- May 8, 1925